APPARATUS FOR THE AUTOMATIC TUNING OF RADIOELECTRIC TRANSMITTERS OR RECEIVERS

Filed May 9, 1955 3 Sheets-Sheet 1

INVENTOR
ANTOINE JEAN MERLES,
BY Larson and Whiting
ATTORNEYS

Dec. 31, 1957 A. J. MERLES 2,818,506

APPARATUS FOR THE AUTOMATIC TUNING OF RADIOELECTRIC TRANSMITTERS OR RECEIVERS

Filed May 9, 1955 3 Sheets-Sheet 2

INVENTOR
ANTOINE JEAN MERLES,
BY Larson and Whiting
ATTORNEYS

INVENTOR
ANTOINE JEAN MERLES,
BY Larson and Whiting
ATTORNEYS 2,818,506

APPARATUS FOR THE AUTOMATIC TUNING OF RADIOELECTRIC TRANSMITTERS OR RECEIVERS

Antoine Jean Merles, Paris, France

Application May 9, 1955, Serial No. 507,042

Claims priority, application France May 18, 1954

10 Claims. (Cl. 250—40)

The present invention relates to apparatus for the automatic tuning of the circuits of radioelectric transmitters or receivers, or combined transmitters and receivers, having multiple channels and especially intended to work on high frequencies.

Such apparatus are in particular intended to adjust the amplifying, oscillating, multiplying or other circuits of said transmitters and/or receivers to the desired working frequency, in response to the shifting of the frequency of an oscillator included in the radio transmitter and/or receiver by insertion, into the circuit thereof and through suitable control means, of a given quartz crystal inserted in the oscillator circuit, or any other devices or means for changing the frequency of said oscillator.

The chief object of my invention is to provide an apparatus of the above described type which makes it possible to achieve a simple accurate automatic tuning.

My invention consists chiefly in making use, to produce at least some of the control operations to be performed for automatic tuning, in particular in order to reduce the rate at which the variable frequency being varied when it is nearing its final desired value, of the passage of this variable frequency through a value predetermined in accordance with the final frequency to be obtained, and for instance differing therefrom by a predetermined amount.

Figure 1:
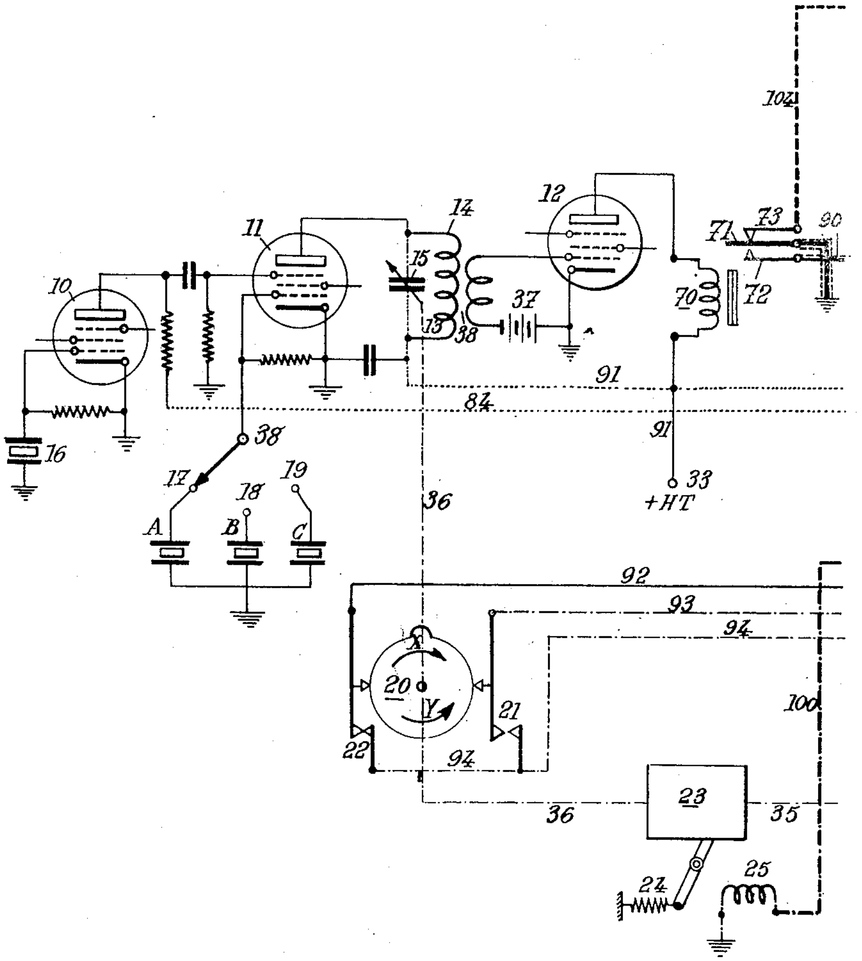
Figure 1A:
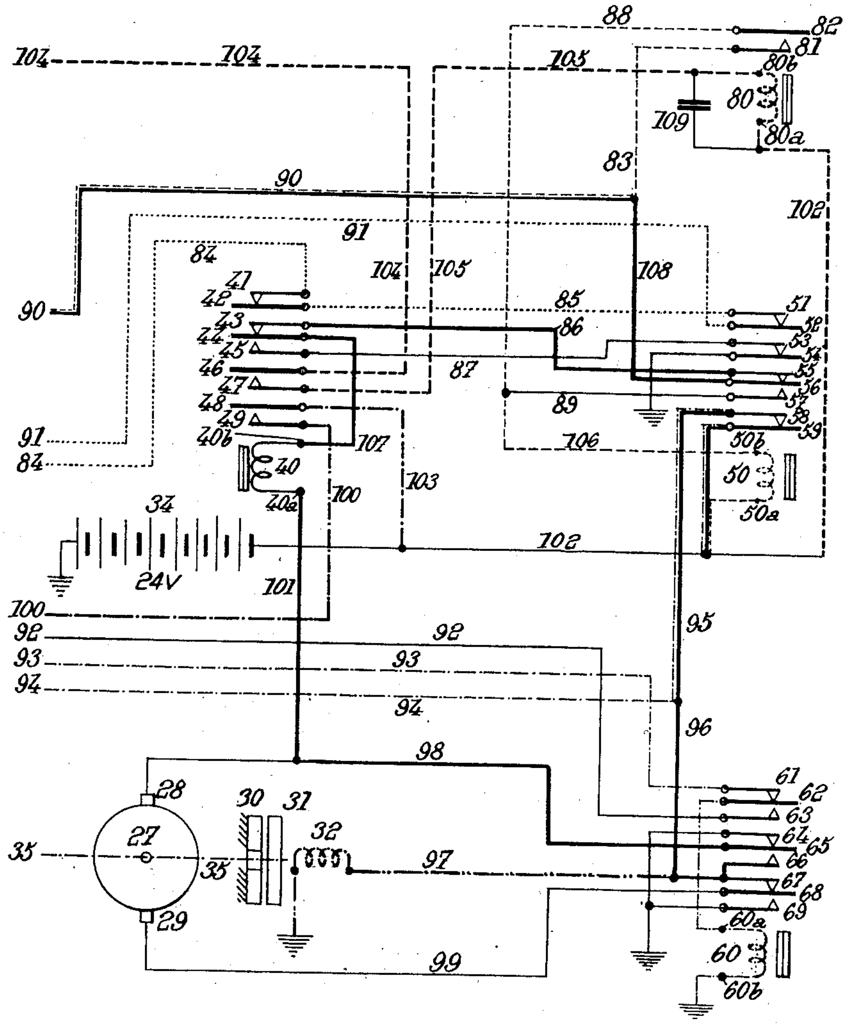

Preferred embodiments of my invention will be hereinafter described with reference to the accompanying drawings given merely by way of example and in which:

Figs. 1 and 1*a* are two complementary figures showing the lay-out of an automatic tuning apparatus according to my invention.

Figure 3:
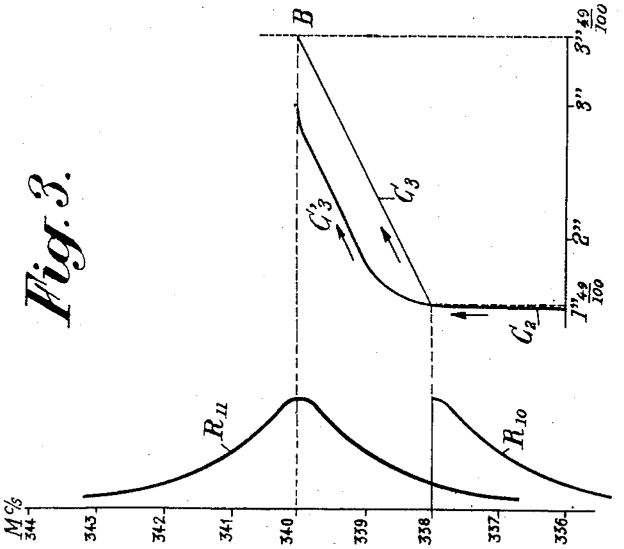
Figure 2:
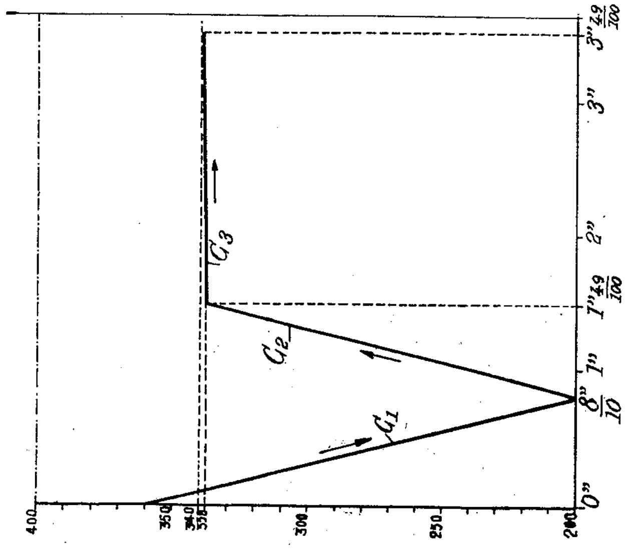

Figs. 2 and 3 are diagrammatical views illustrating the principle of operation of the apparatus according to my invention.

The apparatus illustrated by the drawings, which is a portion of a radio transmitter and/or receiver having several transmission channels, that is to say capable of working at will on one of several different frequencies, includes an oscillator 11 adapted to cooperate with one of several quartz crystals A, B, C with which it may be connected through manual switching means such as 39, 17, 18, 19. When one of these quartz crystals has been brought into operative connection with oscillator 11, it is necessary to adjust, by means of a motor 27, one or several capacitors or other means belonging to the circuits of the apparatus, so as to tune said circuits to the new frequency corresponding to this particular quartz crystal.

According to my invention, the desired tuning is effected in such manner that, being given a detector device (this term being used in its most general meaning) indicating the variations of the frequency of tuning of the circuit or circuits which is to be tuned, use is made of the fact that this tuning frequency passes through a value predetermined in accordance with the frequency to be obtained for controlling at least one of several operations to be effected.

In particular, if the control operations include a first step in which the adjusting means are driven by the electric motor at a high speed V and a second step where this drive is effected at a lower speed *v*, the shift from high speed to low speed of the rotation of the engine is produced by the passage of the frequency of tuning of the circuit or circuits through a value close to the final tuning frequency to be obtained, that is to say to that of the quartz crystal that has been chosen.

Generally it will be advantageous to provide three successive steps, to wit: one during which the motor is driven at a speed V in a direction tending to return the tuning element or elements (capacitors, self inductance coils, etc.), for instance a capacitor 15 inserted in the oscillating circuit 13, toward a starting position; one during which the motor is driven at the same high speed V, but in a direction opposed to the preceding one, until the frequency of tuning of the circuit that is being tuned reaches a value $F-f$ which is but little different from the frequency F to be obtained; and finally a last one step during which the motor is driven at a low speed *v* until the circuit is finally tuned to the value F.

Of course this given merely by way of example and the drive by means of the motor might take place always in the same direction.

Fig. 2 illustrates an operation including three successive steps for passing from transmission or reception on a channel at a frequency of 360 megacycles to transmission on another channel of a frequency equal to 340 megacycles ($F=340$).

The frequencies are plotted in ordinates and the times in abscissas and it is supposed for instance that speed V averages one revolution in two seconds (the capacitor giving for instance, for a revolution of 180°, a variation of the frequency from 200 to 400 megacycles in one second). I obtain a curve such that shown at $C_1$, $C_2$, $C_3$ including three portion: a portion $C_1$ in which capacitor 15 is driven back at a speed V to a position corresponding for instance to tuning on 200 megacycles, a portion $C_2$ corresponding to rotation in the opposed direction, still at speed V, bringing the part into a position corresponding to a value $F-f$, for instance 338 megacycles, $f$ being chosen to average two megacycles, and a portion $C_3$ at speed *v* which corresponds for instance to $$\frac{V}{200}$$

It will therefore be necessary to achieve the following operations: first, starting of the driving motor when passing from one channel to another (for instance in response to the operation of switch 39 on Fig. 1, which is shifted from one of the quartz A, B, C, to another one), then stopping and reversing by acting either directly on the motor, or on transmission means, or both, reducing the speed when the frequency becomes $F-f$, and finally stopping when the frequency becomes F.

Advantageously, the two last mentioned operations will be performed by producing tuning conditions successively on the frequency $F-f$ and on the frequency F and by causing suitable relays to effect the desired operations in response to the production of these two successive tuning conditions.

In order to ensure tuning conditions on frequency $F-f$, I may for instance make use, at the desired time, of a frequency modifying oscillator such as 10 (Fig. 1) the effect of which is to change by a value $f$ the frequency F of oscillator 11.

Fig. 3 shows what takes place at the beginning and the end of the last step $C_3$. At point A, the tuning circuit reaches the top of the resonance curve $R_{10}$ corresponding to the combination of the two oscillators 10 and 11 (frequency $F-f$). At point B, which theoretically is the final point of the operation of capacitor 15, is reached the top of the resonance curve $R_{11}$ corresponding to oscillator 11 alone (frequency F).

I make use of a plurality of relays, to wit: at least one control relay responsive to the obtainment of resonance conditions on $F-f$ and F, which relay may be for instance either of the amplitude type or of the frequency discriminator type or of any other suitable type. The first solution is used in the lay-out shown by the drawing, where a relay 70 of this kind is inserted in the anode circuit of a control tube 12 coupled at 38 with the oscillating circuit of oscillator tube 11, several other relays are used to perform, either separately or in combination, the following operations: reversing of the drive of the capacitor, for instance by reversing the direction in which the motor is running, braking when necessary, by action on coupling elements such as 30, 31 (Fig. 1*a*), speed changing, by action upon a reversing device such as diagrammatically shown at 23, 24 (Fig. 1), and introduction at the desired time, through suitable contacts, of the frequency modifying oscillator 10.

In the embodiment illustrated by the drawings, it has been supposed that the above mentioned relays which cooperate with control relay 70 are four in number, to wit: a relay 40 which is more especially provided for speed changing, a relay 50 which is more especially provided for controlling the motor and its brake, a relay 60 which is more especially provided for controlling the reversing of the drive, and a relay 80 which cooperates with the two first mentioned relays and is normally a delaying relay.

Of course, said relays cooperate together for some operations, and in particular the insertion of the frequency modifying oscillator is achieved by the combined actions of relays 40 and 50.

I will now describe, in a more detailed fashion, the embodiment illustrated on Figs. 1 and 1*a*.

Concerning the electronic portion of this lay-out, it has already been essentially described.

I have shown only a portion of the oscillator, which includes a vacuum tube 11 which may act for instance as a frequency changer (in the case in particular of a receiver). This tube is coupled on the one hand with the control tube 12 (biased at 37) through its tuning circuit 13 including self inductance winding 14 and the capacitor 15 to be controlled, and on the other hand with the frequency modifying oscillator 10 which is piloted by quartz crystal 16.

The frequency supplied by this last mentioned oscillator 10, when it is in operation, creates in tube 11 a frequency which differs by the frequency of quartz crystal 16 from that of the quartz A, B or C which is in operation.

The setting into or out of action of this frequency modifying oscillator is produced by the fact that its anode circuit is fed with high voltage (coming from 33) through wires 84, 91 and 85 through contacts: 41, 42 of relay 40, and 51, 52 of relay 50.

The control tube 12 which, as above stated, is coupled at 38 with the oscillator tube 11 itself adapted to be temporarily combined with the frequency modifying tube 10, is shown only partly on the drawing. Its control grid is connected with the secondary of transformer 38.

This grid circuit is closed through battery 37 which biases this grid in such manner that, in the absence of tuning of the oscillating circuit 13 to the frequency transmitted by tube 11, the plate current of detector tube 12 is very low and cannot bring into or keep in working position relay 70 inserted in its anode circuit. On the other hand, this relay will be operated and kept in working position when the above mentioned tuning is obtained.

The electronic arrangement which has been described relates to the case where use is made, in order to operate control relay 70, of an amplitude detection. But if, for instance, it were desired to replace this kind of detection by a frequency discrimination detection, it might be supposed in particular that the circuit 13 belongs to or acts on the circuit of another oscillator of suitable frequency capable of responding to frequencies such as F and $F-f$ supplied by the quartz crystals (or other suitable means), in order to produce beats. Then the frequency of these beats would be used, in one or several suitable discriminators, to start the desired operations.

As a matter of fact, the invention applies to all means for detecting the passage of the frequencies of tuning through the values $F-f$ (or $F+f$) and F, in order to start said operations.

The driving motor 27 will be supposed for instance to be a direct current motor energized by means of a permanent magnet. This motor drives at 35, 36, through a gear box 23, capacitor 15 and all the other tuning elements which may be included in the circuits, in this case high frequency circuits. In transmission 36 there is interposed a cam device 20 capable of acting in both of the end positions of capacitor 15, in combination with contacts 21, 22, one of these contacts 21 being brought into action (in order to reverse the direction of the drive as it will be hereinafter explained) when the capacitors are in the origin position and the other contact 22 corresponding to the opposed position.

The feed of motor 27, for the two directions of rotation thereof (X and Y on cam 20), is obtained through the two following circuits which cooperate with the reversing control relay 60 and the motor control relay 50:

*1st circuit.*—producing the drive in direction X which returns the variable capacitors to their initial position: Earth—contact of rest 64/65 of relay 60—connection 98—brush 28—armature 27—brush 29—connection 99—contact of rest 67/68 of relay 60—connections 96 and 95—contact of rest 58/59 of relay 50—connection 102 and positive terminal of the 24 volts battery 34.

*2nd circuit.*—achieving the drive in the direction of rotation Y which produces tuning: Earth—working contact 68/69 of relay 60—connection 99—brush 29—armature 27—brush 28—connection 98—working contact 65/66 of relay 60—connections 96 and 95—contact of rest 58/59 of relay 50—connection 102 and positive terminal of the 24 volts battery 34.

Concerning the gear box 23, which may be of any suitable type, it is for instance controlled by a solenoid 25 operating a lever against the action of a spring 24, this solenoid being in particular fed through the speed changing relay 40 through the following circuit: Earth—solenoid 25—connection 100—working contact 48/49 of relay 40—connections 103 and 102 and positive terminal of the 24 volts battery 34.

When current is flowing through the solenoid, the gear box is in low gear; in the contrary case, it is in high gear.

Finally, concerning the brake device the control of which is obtained by means of relay 50, it includes for isntance a fixed plate 30 and a movable plate 31 driven by shaft 35 and rubbing in braking position on the fixed plate.

A solenoid 32 controls the position of plate 31 which is pulled toward the solenoid when current is flowing therethrough, so as to stop the normal braking action.

The feed circuit of solenoid 32 is for instance as follows, in combination with relay 50: Earth—solenoid 32—connections 97, 96 and 95—contact of rest 58/59 of relay 50—connection 102 and positive terminal of the 24 volts battery 34.

Concerning relays 40, 50, 60, 70, their circuits are hereinafter described.

RELAY 40

*Feed circuit.*—Earth—working contact 71/72 of relay 70—connections 90 and 108—contact of rest 55/56 of relay 50—connection 86—contact of rest 43/44 of relay 40—40*b*—connection 107—solenoid 40—40*a*—connections 101 and 98—working contact 65/66 of relay 60—connections 96 and 95—contact of rest 58/59 of relay 50—connection 102 and positive terminal of battery 34.

*Maintaining circuit.*—Earth—contact of rest 53/54 of relay 50—connection 87—working contact 44/45 of relay 40—40*b*—solenoid 40—40*a* and then same as for the feed circuit.

RELAY 50

*Feed circuit.*—Earth—working contact 71/72 of relay 70—connections 90 and 83—working contact 81/82 of relay 80—connections 88 and 106—50*b*—solenoid 50—50*a*—connection 102 and positive terminal of battery 34.

*Maintaining circuit.*—Earth—working contact 71/72 of relay 70—connections 90 and 108—working contact 56/57 of relay 50—connections 89 and 106—50*b*—solenoid 50—50*a*—connection 102 and positive terminal of battery 34.

RELAY 60

*Feed circuit.*—Earth—60*b*—solenoid 60—60*a*—contact of rest 61/62 of relay 60—connection 93—contact 21—connections 94 and 95—contact of rest 58/59 of relay 50—connection 102 and positive terminal of battery 34.

*Maintaining circuit.*—Earth—60*b*—solenoid 60—60*a*—working contact 62/63 of relay 60—connection 92—contact 22—connections 94 and 95—contact of rest 58/59 of relay 50—connection 102 and positive terminal of battery 34.

RELAY 80

*Feed circuit.*—Earth—contact of rest 71/73 of relay 70—connection 104—working contact 46/47 of relay 40—connection 105—80*b*—solenoid 80—80*a*—connection 102 and positive terminal of battery 34.

It should be noted that this relay, which controls through its working contact 81/82 the feed circuit of relay 50, is slightly delayed in the performance of its movements by capacitor 109.

I will now describe the operation of the apparatus.

*1. Quartz A—Tuning obtained*

It will be supposed that quartz A is in operation and that oscillating circuit 13 is tuned to the frequency of this quartz crystal.

The high energy frequency transmitted by transformer 38 to the grid of control tube 12 keeps relay 70 in working position. The working contact 71—72 is therefore closed and: the motor is stopped, relay 50 is in working position, relay 40 is in position of rest, relay 60 is in position of rest, relay 80 is in position of rest, the gear box is in high gear, the brake is in operation, the frequency modifying oscillator 10 does not work.

Relay 50 is kept in working position by its maintaining circuit, owing to the working contact 71—72 of relay 70 which is in working position.

Relay 40 is in position of rest because: its maintaining circuit is cut off by contact 53/54 of relay 50 in working position, its feed circuit is also cut off by the contact of rest 55/56 of relay 50 in working position. Furthermore, the working contact 65/66 of relay 60 in working position cuts off the two feed circuits of this relay 40 which is thus locked in position of rest.

Relay 60 is in position of rest because: its maintaining circuit is cut off by the working contact 62/63 of relay 60 in position of rest, its feed circuit is also cut off by contact 21 which is open and by the contact of rest 58/59 of relay 50 in working position.

Relay 80 is in position of rest because: its feed circuit is cut off by the working contact 46/47 of relay 40 in position of rest.

Motor 27 is stopped because its feed circuits are cut off, on the side of the positive terminal of the 24 volts battery by the contact of rest 58/59 of relay 50 in working position.

Gear box 23 is in high gear corresponding to speed V because the feed circuit of solenoid 25 is cut off by the working contact 48/49 of the relay 40 in position of rest.

Brake 30, 31 is in operation because the feed circuit of solenoid 32 is cut off by the contact of rest 58/59 of relay 50 in working position.

The frequency modifying oscillator 10 is not in operation because the high voltage circuit of this tube is cut off by the contact of rest 51/52 of relay 50 in working position.

*2. Shifting from quartz crystal A to quartz crystal B*

If the arm of switch 39 is shifted from quartz crystal A to quartz crystal B, this operation temporarily cuts off the grid circuit of tube 11 and the high frequency circuits. Tube 12 being no longer energized, relay 70 comes into position of rest and the working contact 71/72 of this relay is open, which then produces the following results:

Relay 50, which was precedingly in working position, comes into position of rest.

Relays 40, 60 and 80 remain in position of rest and relay 40 is locked in this position.

The brake is no longer applied.

The motor, due to the return of relay 50 to its position of rest, starts rotating in direction X, and it drives at high speed shaft 36, which is rigid with the variable capacitors and with cam 20, toward the initial position of these capacitors.

The frequency modifying oscillator 10 and tube 11 are in operation but produce no result because relay 40 is locked in position of rest.

Relay 50 comes into position of rest because its maintaining circuit is temporarily opened by the opening of the working contact 71/72 of relay 70 which has come into position of rest when the arm of switch 39 was shifted from one quartz crystal to the other. Subsequently this relay remains cut off by the working contact 56/57 of relay 50 in position of rest.

Relay 40 remains in position of rest because its feed and maintaining circuits are kept cut off by the working contact 65/66 of relay 60 in position of rest. This locks relay 40 in position of rest for the whole of this movement and whatever be the position of relay 70.

Relay 60 remains in position of rest because its feed circuit is cut off by switch 21 and its maintaining circuit is cut off by the working contact 62/63 of relay 60 in position of rest.

Relay 80 remains in position of rest because its feed circuit is still cut off by the working contact 46/47 of relay 40 in position of rest.

The brake is no longer applied because solenoid 32 has its feed circuit closed by the contact of rest 58/59 of relay 50 in position of rest.

The gear box remains in high gear because solenoid 25 still has its feed circuit cut off by the working contact 48/49 of relay 40 in position of rest.

Motor 27 is running and drives at high speed shaft 36 in direction X (i. e. toward the initial position) because its circuit is closed, as already stated for the first feed circuit of the motor.

The frequency modifying oscillator 10 is in operation because its high voltage circuit is closed by the contacts 41/42 and 51/52 of relays 40 and 50, respectively.

The high frequency from tube 11 can actuate during this movement relay 70. But as above stated, the position of this relay 70 no longer has any action upon relay 40, and therefore upon the whole device, which is locked.

*3. Arrival in direction X into the initial position*

When cam 20 arrives into its initial position it closes the contact of switch 21. It then produces the following results:

Relay 60 comes into working position and remains therein.

Relay 40 remains in position of rest but it is unlocked and will be able to work under the action of relay 70.

Relay 50 remains in position of rest.

Relay 80 remains in position of rest.

The brake is not acting.

The motor runs in the opposed direction (Y) and still drives at high speed shaft 36 in this direction Y.

The frequency modifying tube 10 is working.

Relay 60 comes into working position because its feed circuit is closed through the contact of switch 21 pushed by cam 20.

Its maintaining circuit is then closed through the working contact 62/63 of relay 60 in working position.

Relay 40 comes into position of rest but is unlocked because the working contact 65/66 of relay 60 in working position prepares the closing on the side of the positive terminal of the 24 volts battery, of its feed circuit which subsequently will be closed by the action of relay 70 and of its maintaining circuit.

Relay 50 remains in position of rest, its feed circuit being cut off by the working contact 46/47 of relay 40 in position of rest; its maintaining circuit is cut off by the working contact 56/57 of relay 50 in position of rest.

Relay 80 remains in position of rest, its feed circuit being still cut off by the working contact 46/47 of relay 40 in position of rest.

The brake is not applied because the feed circuit of solenoid 32 remains closed by the contact of rest 58/59 of relay 50 in position of rest.

The gear box remains in high gear because the circuit of solenoid 25 is cut off by the working contact 48/49 of relay 40 in position of rest.

The motor runs in the opposed direction Y because it is fed through its second feed circuit, as above explained.

The frequency modifying oscillator tube 10 is in operation because it is fed with high voltage through the contacts of rest 41/42 and 51/52 of relays 40 and 50 in position of rest.

The variable capacitors, starting from their initial position, therefore rotate at high speed in direction Y toward the position corresponding to tuning of oscillating circuit 13 to the characteristic frequency $F-f$ supplied by tube 11 under action of oscillator 10.

*4. Passage in direction Y through the position where the oscillating circuit is tuned to frequency* $(F-f)$ This operation produces two sets of movements:

*1st set of movements.*—When the variable capacitor 15, in the course of its movement, causes oscillating circuit 13 to be tuned to a frequency equal to that of quartz crystal B less the frequency of quartz crystal 16, control tube 12 will act and supply current. Under its action, relay 70 will pass temporarily into working position.

The temporary closing of working contact 71/72 will produce the following movements:

Relay 40 shifts into working position and keeps therein.

Relay 50 remains in position of rest.

Relay 60 remains in working position.

Relay 80 remains in position of rest.

The brake is still not in operation.

The gear box passes to low gear.

The motor then drives, still in direction Y but at low speed $v$, the shaft 36 of the variable capacitors.

The frequency modifying tube 10 is no longer operative.

Relay 40 comes into working position and remains therein because temporarily its feed circuit is closed through the working contact 71/72 of relay 70 temporarily in working position. Its maintaining circuit then closes through the working contact 44/45 of relay 40 in working position.

Relay 50 remains in position of rest because its feed circuit is cut off by the working contact 81/82 of relay 80 in position of rest. Its maintaining circuit is still cut off by the working contact 56/57 of relay 50 in position of rest.

Relay 60 remains in working position because its maintaining circuit is still closed by the contact of rest 58/59 of relay 50 in position of rest and by the working contact 62/63 of relay 60 in working position.

Relay 80 remains in position of rest because its feed circuit is cut off by the contact of rest 71/73 of relay 70 in working position.

The brake is still not in operation because the feed circuit of solenoid 32 is still closed by the contact of rest 58/59 of relay 50 in working position.

The gear box passes from high gear to low gear because solenoid 25 has its feed circuit closed through the working contact 48/49 of relay 40 in working position. The variable capacitors keep rotating in direction Y, but at low speed.

The motor is fed with current, as in the preceding case, through its second feed circuit. It therefore drives shafts 35 and 36 in direction Y.

The frequency modifying oscillator 10 has had its high voltage circuit immediately cut off by the temporary operation of relay 70 which has brought relay 40 into working position, and therefore has opened in this relay the contact of rest 41/42 thereof.

The frequency modifying oscillator is therefore out of operation and the stopping of this oscillator produces the second set of movements.

*2nd set of movements.*—The frequency of quartz crystal B is then the only one to be used but, before tuning of oscillating circuit 13, to this frequency, the following operations take place:

Relay 70 comes back into position of rest which produces the following movements:

Relay 80 comes into working position.

Relay 40 remains in working position.

Relay 50 remains in position of rest.

Relay 60 remains in working position.

The brake is still not in operation.

The gear box remains in low gear.

The motor still drives shaft 36 in direction Y but at low speed.

The frequency modifying oscillator 10 is still not operative.

Relay 70 comes back into position of rest because the circuit of control tube 12 is no longer receiving high frequency energy as oscillating circuit 13 is not tuned to the frequency of quartz crystal B.

Relay 80 comes into working position, its feed circuit being closed by the contact of rest 71/73 of relay 70 in position of rest and by the working contact 46/47 of relay 40 in working position.

Relay 40 remains in working position because its maintaining circuit is closed through the working contact 44/45 of the relay in working position.

Relay 50 remains in position of rest, its feed circuit being cut off by the working contact 71/72 of relay 70 in position of rest.

Its maintaining circuit is also cut off by the working contact 71/72 of relay 70 in position of rest and by the working contact 56/57 of relay 50 in position of rest.

Relay 60 still remains in working position, its maintaining circuit being still closed by the contact of rest 58/59 of relay 50 in position of rest and by the working contact 62/63 of relay 60 in working position.

The brake is still inoperative because the feed circuit of solenoid 32 is still closed by the contact of rest 58/59 of relay 50 in position of rest.

The gear box remains in low gear as solenoid 25 has its feed circuit still closed by the working contact 48/49 of relay 40 in working position.

The motor is still fed through its second feed circuit. It therefore drives at low speed the shafts 35 and 36 in direction Y.

The frequency modifying oscillator 10 is not working, its high voltage circuit being cut off by the contact of rest 41/42 of relay 40 in working position.

*5. Arrival in final tuning position*

When the variable capacitor 15 achieves the tuning of oscillating circuit 13 to the frequency of quartz crystal B, the control tube 12 feeds relay 70 which passes back into working position. The working contact 71/72 of this relay is then closed and produces the following movements.

Relay 50 comes into working position and remains therein.

Relay 40 comes into position of rest.

Relay 80 comes into position of rest.

Relay 60 comes into position of rest.

The motor stops.

The brake is applied.

The gear box passes into high gear.

The frequency modifying oscillator 10 is not working.

The cycle is finished.

Relay 50 comes into working position because its feed circuit is closed through the working contact 71/72 of relay 70 in working position and through the working contact 81/82 of relay 80 in working position.

Its maintaining circuit is subsequently closed and remains so, whatever be the position of relay 80, through the working contact 56/57 of relay 50 which is then in working position and through the working contact 71/72 of relay 70 in working position.

Relay 40 comes into position of rest because its maintaining circuit is cut off by the contact of rest 53/54 of the relay 50 in working position. Its feed circuit is cut off by the contact of rest 55/56 of relay 50 in working position.

Relay 60 then comes into position of rest because its maintaining circuit, as its feed circuit, is cut off by the contact of rest 58/59 of relay 50 in working position.

Relay 80 comes back with a slight delay into position of rest because its feed circuit is cut off by the contact of rest 71/73 of relay 70 in working position.

The motor stops because its two feed circuits are cut off by the contact 58/59 of relay 50 in working position.

For the same reason, the feed circuit of solenoid 32 is cut off and the brake is applied.

The gear box passes to high gear because the feed circuit of solenoid 25 is cut off by the working contact 48/49 of relay 40 in position of rest.

The frequency modifying oscillator 10 is no longer fed with current, its high voltage circuit being cut off by the contact of rest 51/52 of relay 50 in working position.

The apparatus is stopped in the desired tuning position and the cycle is finished. The situation is the same as that existing at the beginning of the operation.

The elements are ready for a new cycle of operations in case of shifting from one quartz crystal to another one.

It should be noted that switch 22 which can be actuated by cam 20 at the end of this movement in direction Y constitutes a safety device. If, for some reason, the device has not worked during the rotation in direction Y, at the end of the cycle the contact of switch 22 opens.

Opening of this contact then causes relay 60 to come into position of rest and relay 40 to be locked in position of rest, whereby a new complete cycle with return to the initial position is again started as above described.

The apparatus according to my invention has the following advantages: it is very accurate in its operation, it permits a high ratio between speeds V and $v$ and it has a relatively simple lay-out.

Of course my invention is not limited to the embodiments above described and in particular return of the capacitors to their initial position might be such that these capacitors, instead of being then at the lowest frequency of the range of frequencies, are at the highest value of this range. In this case, shifting from speed V to speed $v$ would take place for a frequency $F+f$ instead of $F-f$.

Of course, the tuning elements constituted in the above examples by variable capacitors rotating through an angle of 180° might be replaced by other equivalent elements such as variable self-inductance coils.

I might use more than two gear combinations in the gear box.

The electromechanical relays above referred to illustrated by the drawings might be replaced by other electric or electronic elements (neon tubes, thyratrons, etc.).

The tuning control device which, in the above examples, consists of an amplitude detecting tube or a frequency discriminator element or other device, together with its relay 70, might be different and I might use this relay to act upon auxiliary circuits such for instance as a variable reactance tube, to perfect the final tuning of the oscillating circuit.

Obtainment of frequency $F+f$ or $F-f$ might be achieved in a different fashion.

For instance if the apparatus uses, for obtaining the frequencies corresponding to the respective channels, a complex device such as a frequency generator (crystal, saver, monitor, etc.) supplying for every channel the desired frequency owing to the combination or to the gradual selection of several frequencies acting together, I might obtain the modified frequency $F-f$ or $F+f$ which controls gear shifting by producing it, same as the desired frequency F, by means of the complex device above referred to.

It will then be possible to dispense with the quartz crystal 16 of Fig. 1.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. For use in connection with at least one radio-electric circuit including movable means for tuning it to at least two different frequencies supplied by a source, an automatic tuning device which comprises a motor and a change speed device cooperating therewith for actuating said means at two different rates of movement for correspondingly varying the frequency of tuning of said circuit, means for modifying the frequency of said source to a value close to the normal frequency thereof, means for shifting said change speed device from high gear to low gear in response to the passing of said frequency of tuning, as it is varying toward said source frequency, through said value, means responsive to said gear shifting for bringing said frequency modifying means out of operation, and means for stopping said motor when said frequency of tuning becomes equal to the frequency of said source.

2. For use in connection with at least one radio-electric circuit including movable means for tuning it to at least two different frequencies supplied by a source, an automatic tuning device which comprises a motor and a change speed device cooperating therewith for actuating said means at two different rates of movement for correspondingly varying the frequency of tuning of said circuit, means for changing the frequency F of said source by a small amount $f$, means for shifting said change speed device from high gear to low gear in response to the passing of said frequency of tuning, as it is varying toward said source frequency through said changed value, means responsive to said gear shifting for bringing said frequency changing means out of operation, and means for stopping said motor when said frequency of tuning becomes equal to the frequency F of said source.

3. For use in connection with at least one radio-electric circuit including movable means for tuning it to at least two different frequencies supplied by an oscillator, an automatic tuning device which comprises a motor and a change speed device cooperating therewith for actuating said means at two different rates of movement for correspondingly varying the frequency of tuning of said circuit, a second oscillator adapted to cooperate with said first mentioned one for modifying the frequency F of said oscillator by a small amount $f$, means for shifting said change speed device from high gear to low gear in response to the passing of said frequency of tuning, as it is varying toward said frequency F, through said value, means responsive to said gear shifting for bringing said second mentioned oscillator out of operation, and means for stopping said motor when said frequency of tuning becomes equal to the frequency F of said first mentioned oscillator.

4. For use in connection with at least one radio-electric circuit including movable means for tuning it to at least two different frequencies supplied by an oscillator tube, an automatic tuning device which comprises a motor and a change speed device cooperating therewith for actuating said means at two different rates of movement for correspondingly varying the frequency of tuning of said circuit, a second oscillator adapted to cooperate with said first mentioned oscillator for modifying the frequency F of said oscillator by a small amount $f$, means responsive to adjustment of said first mentioned oscillator to a given frequency for operating said motor, with said change speed device in high gear in reversing direction to return the frequency of tuning of said circuit to a given initial value, means responsive to the return to said value for immediately starting back said motor, still with said change speed device in high gear, in the opposed direction to gradually vary the frequency of tuning of said circuit toward the value F, means for shifting said change speed device from high gear to low gear in response to the passing of said frequency of tuning, as it is varying toward said frequency F, through value $F-f$, means responsive to said gear shifting for bringing said frequency modifying means out of operation, and means for stopping said motor when said frequency of tuning becomes equal to frequency F.

5. An apparatus according to claim 4 in which operation of said motor in reversing direction is responsive to the temporary cutting off the grid circuit of said first oscillator tube necessary for adjustment thereof.

6. An apparatus according to claim 4 including an electric contact and a cam driven by said motor for stopping it at the end of its operation in reversing direction.

7. An apparatus according to claim 4 in which said gear shifting means are responsive to tuning of said circuit to frequency $F-f$ and said motor stopping means are responsive to tuning of said circuit to frequency F.

8. An apparatus according to claim 7 in which said two last mentioned means include a single relay arranged to be energized first by tuning of the circuit to frequency $F-f$, and then by tuning to frequency F.

9. An apparatus according to claim 8 in which this control relay is of the amplitude type.

10. An apparatus according to claim 8 in which this control relay is of the amplitude type, a detector tube the feed circuit of said amplitude relay being the anode circuit of said detector tube, the grid circuit of said detector tube being coupled with said circuit to be tuned.

References Cited in the file of this patent

UNITED STATES PATENTS

| | | |
|---|---|---|
| 2,152,336 | Van Loon | Mar. 28, 1939 |
| 2,207,467 | Muller | July 9, 1940 |
| 2,719,923 | McNaney | Oct. 4, 1955 |